(12) United States Patent
Fujio

(10) Patent No.: US 8,979,659 B2
(45) Date of Patent: Mar. 17, 2015

(54) FIXED-TYPE CONSTANT-VELOCITY UNIVERSAL JOINT

(75) Inventor: Teruaki Fujio, Iwata (JP)

(73) Assignee: NTN Corporation, Osaka (JP)

(*) Notice: Subject to any disclaimer, the term of this patent is extended or adjusted under 35 U.S.C. 154(b) by 0 days.

(21) Appl. No.: 13/993,387

(22) PCT Filed: Dec. 6, 2011

(86) PCT No.: PCT/JP2011/078130
§ 371 (c)(1),
(2), (4) Date: Jun. 12, 2013

(87) PCT Pub. No.: WO2012/093537
PCT Pub. Date: Jul. 12, 2012

(65) Prior Publication Data
US 2013/0267332 A1    Oct. 10, 2013

(30) Foreign Application Priority Data

Jan. 6, 2011 (JP) ................................. 2011-001293

(51) Int. Cl.
*F16D 3/224* (2011.01)
*F16D 3/24* (2006.01)
*F16D 3/223* (2011.01)

(52) U.S. Cl.
CPC *F16D 3/24* (2013.01); *F16D 3/224* (2013.01); *F16D 2003/22303* (2013.01); *F16D 2003/22309* (2013.01); *Y10S 464/906* (2013.01)
USPC .......................................... 464/144; 464/906

(58) Field of Classification Search
USPC .......................................... 464/143–146, 906
See application file for complete search history.

(56) References Cited

U.S. PATENT DOCUMENTS

| | | | | |
|---|---|---|---|---|
| 4,678,453 | A * | 7/1987 | Aucktor et al. | 464/144 |
| 6,431,988 | B1 * | 8/2002 | Tone | 464/145 |
| 7,077,753 | B2 * | 7/2006 | Kuczera et al. | 464/144 |

(Continued)

FOREIGN PATENT DOCUMENTS

| | | |
|---|---|---|
| JP | 3300663 | 7/2002 |
| JP | 2006-266424 | 10/2006 |

(Continued)

OTHER PUBLICATIONS

International Search Report issued Jan. 31, 2012 in International (PCT) Application No. PCT/JP2011/078130.

(Continued)

*Primary Examiner* — Gregory Binda
*Assistant Examiner* — Josh Skroupa
(74) *Attorney, Agent, or Firm* — Wenderoth, Lind & Ponack, LLP

(57) ABSTRACT

A fixed type constant velocity universal joint includes eight or twelve torque transmitting balls arranged in ball tracks formed of pairs of track grooves of an outer joint member and track grooves of an inner joint member, respectively. A center of curvature of each of the track grooves of the outer joint member and a center of curvature of each of the track grooves of the inner joint member have an axial offset of zero. When eight torque transmitting balls are employed, the track grooves of the outer joint member and the inner joint member each include inclined tracks arranged at a 90° pitch along a circumferential direction and inclined in opposite directions with respect to an axial line and other tracks which are formed between the inclined tracks and parallel to the axial line.

20 Claims, 18 Drawing Sheets

(56) References Cited

U.S. PATENT DOCUMENTS

| | | | |
|---|---|---|---|
| 7,347,786 B2 * | 3/2008 | Mondragon-Parra et al. | 464/144 |
| 7,717,793 B2 * | 5/2010 | Mondragon-Parra et al. | 464/144 |
| 2007/0259724 A1 * | 11/2007 | Pohl | 464/144 |
| 2009/0069101 A1 | 3/2009 | Hayama | |
| 2010/0216559 A1 * | 8/2010 | Braun et al. | 464/145 |

FOREIGN PATENT DOCUMENTS

| | | | | |
|---|---|---|---|---|
| JP | 3859264 | | 12/2006 | |
| JP | 2007-132379 | | 5/2007 | |
| JP | 2007-270868 | | 10/2007 | |
| JP | 2009-085326 | | 4/2009 | |
| JP | 2009-250365 | | 10/2009 | |
| JP | 2010043667 A | * | 2/2010 | F16D 3/224 |

OTHER PUBLICATIONS

International Preliminary Report on Patentability and Written Opinion of the International Searching Authority issued Jul. 18, 2013 in corresponding International (PCT) Application No. PCT/JP2011/078130.

* cited by examiner

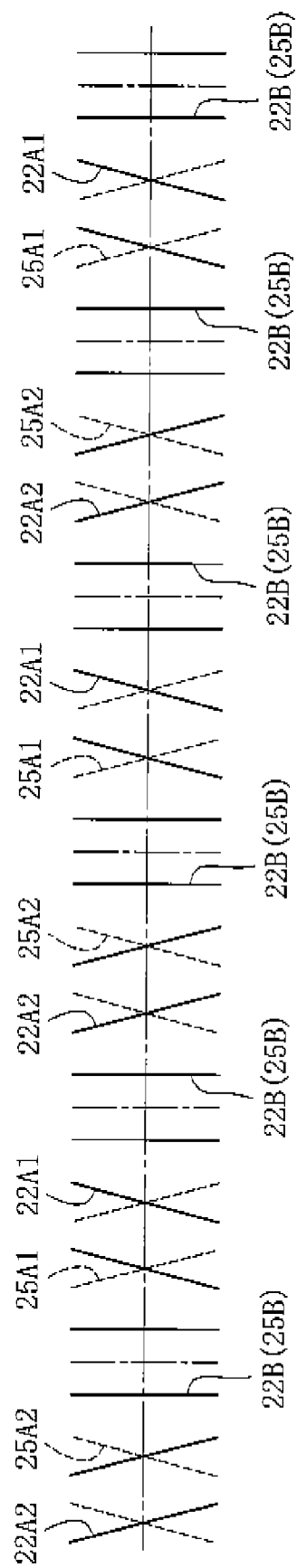

FIXED-TYPE CONSTANT-VELOCITY UNIVERSAL JOINT

TECHNICAL FIELD

The present invention relates to a fixed type constant velocity universal joint to be used, for example, in power transmission systems for automobiles and various other industrial machines.

BACKGROUND ART

As types of a fixed type constant velocity universal joint, there have been widely known a Birfield type (BJ) and an undercut free type (UJ). FIGS. 18 and 19 illustrate a fixed type constant velocity universal joint of the Birfield type (BJ).

This fixed type constant velocity universal joint includes an outer joint member 3 having an inner surface 1 including a plurality of (six) track grooves 2 formed equiangularly along an axial direction, an inner joint member 6 having an outer surface 4 including a plurality of (six) track grooves 5 formed in pairs with the respective track grooves 2 of the outer joint member 3 equiangularly along the axial direction, a plurality of (six) balls 7 which are interposed between the track grooves 2 of the outer joint member 3 and the track grooves 5 of the inner joint member 6 and transmit torque, and a cage 8 which is interposed between the inner surface 1 of the outer joint member 3 and the outer surface 4 of the inner joint member 6 and holds the balls 7. The cage 8 includes a plurality of pockets 9 which are arranged along a circumferential direction and house the balls 7.

A center of curvature O2 of each of the track grooves 5 of the inner joint member 6 and a center of curvature O1 of each of the track grooves 2 of the outer joint member 3 are offset to each other to opposite sides by equal distances F and F in the axial direction with respect to a joint center O. In other words, provision of such an offset is referred to as "track offset type."

In this way, in the fixed type constant velocity universal joint of the Birfield type (BJ) illustrated in FIGS. 18 and 19, a groove bottom of each of the track grooves 2 and 5 includes a circular-arc portion. Meanwhile, in the undercut free type (UJ), the groove bottom of each of the track grooves 2 and 5 includes a circular-arc portion and a linear portion (straight portion).

In recent years, for the purpose of weight reduction and compactification, there have been proposed fixed type constant velocity universal joints in which the balls 7 as torque transmitting members include eight balls 7 as illustrated in FIGS. 20 and 21. Specifically, the balls are downsized and the number of the balls is set to eight so that reduction of a load capacity of each of the balls is suppressed, to thereby achieve high performance and compactification.

In one of conventional fixed type constant velocity universal joints including eight balls, a center of each guide groove of the outer joint member is offset to a joint opening side with respect to a spherical center of the inner surface, and a center of each guide groove of the inner joint member is offset to a joint depth side with respect to a spherical center of the outer surface respectively toward opposite sides by equal distances in the axial direction. In addition, a ratio of a pitch circle diameter of the balls and a diameter of the balls is set within a predetermined range (Patent Literature 1).

According to Patent Literature 1, it is possible to provide a more compact fixed type constant velocity universal joint for automobiles, in which a temperature rise and a torque loss during operation are low, and a strength, a load capacity, a durability, and an operating angle which are equal to or higher than those of the fixed type constant velocity universal joint including six balls can be secured.

Further, another of conventional fixed type constant velocity universal joints includes track grooves formed into a helical shape or an inclined shape (Patent Literature 2). In this case, the track grooves are formed into the helical shape or the inclined shape, and in addition, the track grooves include track grooves which are adjacent to each other in the circumferential direction and arranged in plane symmetry. With this setting, fatigue and peeling at contact parts are reduced, and durability and a torque transmitting function of the constant velocity universal joint are enhanced.

CITATION LIST

Patent Literature 1: JP 3859264 B
Patent Literature 2: JP 3300663 B

SUMMARY OF INVENTION

Technical Problems

By the way, as disclosed in Patent Literature 1, for instance, when the center of curvature O2 of each of the track grooves 5 of the inner joint member 6 and the center of curvature O1 of each of the track grooves 2 of the outer joint member 3 are offset to the opposite sides by the equal distances F and F in the axial direction with respect to the joint center O, as illustrated in FIG. 22, the balls 7 each form a wedge angle τ under a state of being sandwiched between the track groove 5 of the inner joint member 6 and the track groove 2 of the outer joint member 3. The ball 7 is pressed to the joint opening side within a range of the wedge angle τ. In other words, the cage 8 is pressed to the joint opening side by a force W generated by the ball 7.

When the cage 8 is pressed to the joint opening side in this way, an outer spherical surface 8*a* of the cage 8 and the inner surface 1 of the outer joint member 3 are brought into contact with each other, and an inner spherical surface 8*b* of the cage 8 and the outer surface 4 of the inner joint member 6 are brought into contact with each other. Thus, under high load and in high speed rotation, heat may be generated, with the result that durability may be deteriorated.

Note that, as illustrated in FIG. 23, when the track offset is not provided, in other words, the center of curvature O1 of each of the track grooves 2 of the outer joint member 3 and the center of curvature O2 of each of the track grooves 5 of the inner joint member 6 match with the joint center O, the wedge angle τ as illustrated in FIG. 22 is not formed. However, in the configuration of this type, a force of suppressing the cage 8 is not generated, and hence the constant velocity universal joint is not operated.

Further, the track offset is provided also in the fixed type constant velocity universal joints disclosed in Patent Literature 2, and a force applied to the cage 8 is reduced in accordance with reduction in ball contact force in the track grooves. However, also in such a case, under high load and in high speed rotation, the outer spherical surface 8*a* of the cage 8 and the inner surface 1 of the outer joint member 3 are brought into contact with each other, and the inner spherical surface 8*b* of the cage 8 and the outer surface 4 of the inner joint member 6 are brought into contact with each other. Thus, heat may be generated, with the result that durability may be deteriorated.

In view of the circumstances described above, the present invention provides a fixed type constant velocity universal joint which suppresses heat generation under high load and in high speed rotation, has a higher durability, and involves less torque loss.

Solution to Problems

According to the present invention, there is provided a first fixed type constant velocity universal joint, comprising: an outer joint member having an inner surface including eight track grooves; an inner joint member having an outer surface including eight track grooves; eight torque transmitting balls arranged in ball tracks formed of pairs of the eight track grooves of the outer joint member and the eight track grooves of the inner joint member, respectively; and a cage which is interposed between the inner surface of the outer joint member and the outer surface of the inner joint member and holds the eight torque transmitting balls, wherein a center of curvature of each of the eight track grooves of the outer joint member and a center of curvature of each of the eight track grooves of the inner joint member have an axial offset of zero, and wherein the eight track grooves of each of the outer joint member and the inner joint member comprise: inclined tracks arranged at a 90° pitch along a circumferential direction and inclined in opposite directions with respect to an axial line; and other tracks which are formed between the inclined tracks and parallel to the axial line.

According to the present invention, there is provided a second fixed type constant velocity universal joint, comprising: an outer joint member having an inner surface including twelve track grooves; an inner joint member having an outer surface including twelve track grooves; twelve torque transmitting balls arranged in ball tracks formed of pairs of the twelve track grooves of the outer joint member and the twelve track grooves of the inner joint member, respectively; and a cage which is interposed between the inner surface of the outer joint member and the outer surface of the inner joint member and holds the twelve torque transmitting balls, wherein a center of curvature of each of the twelve track grooves of the outer joint member and a center of curvature of each of the twelve track grooves of the inner joint member have an axial offset of zero, and wherein the twelve track grooves of each of the outer joint member and the inner joint member comprise: inclined tracks arranged at a 60° pitch along a circumferential direction and inclined in opposite directions with respect to an axial line; and other tracks which are formed between the inclined tracks and parallel to the axial line.

According to the first and second fixed type constant velocity universal joints, at low angles, forces are alternately applied to adjacent ones of window portions (pockets) of the cage, which correspond to the inclined tracks intersecting each other, so that a position of the cage is stabilized in bisecting planes of the inner joint member and the outer joint member. Further, the eight track grooves and the twelve track grooves each comprise the other tracks parallel to the axial line, and orbits of ones of the eight torque transmitting balls or ones of the twelve torque transmitting balls, which are housed in the other tracks parallel to the axial line, are not significantly shifted in the circumferential direction. Thus, a circumferential length of each one of the pockets, which houses corresponding one of the eight torque transmitting balls or corresponding one of the twelve torque transmitting balls, which are fitted to the other tracks parallel to the axial line, can be reduced. In other words, the pockets comprise pockets, which are adjacent to each other in the circumferential direction, and each have a different circumferential length.

The center of curvature of each of the eight track grooves or the twelve track grooves of the outer joint member and the center of curvature of each of the eight track grooves or the twelve track grooves of the inner joint member may be displaced with respect to a joint center in a radial direction.

The first and second fixed type constant velocity universal joints may each comprise an undercut free type fixed type constant velocity universal joint in which a bottom surface of each of the eight track grooves or the twelve track grooves of the outer joint member and a bottom surface of each of the eight track grooves or the twelve track grooves of the inner joint member each comprise a curved portion and a straight portion.

The straight portion of the each of the eight track grooves or the twelve track grooves of the outer joint member may comprise a tapered portion inclined toward an outer diameter side from a depth side to an opening side, and the straight portion of the each of the eight track grooves or the twelve track grooves of the inner joint member may comprise a tapered portion inclined toward the outer diameter side from the opening side to the depth side.

The eight track grooves of each of the outer joint member and the inner joint member or the twelve track grooves of each of the outer joint member and the inner joint member may each be formed through forging or through a machining process.

Advantageous Effects of Invention

The fixed type constant velocity universal joints of the present invention are operated in a manner that the position of the cage is stabilized in the bisecting planes of the inner joint member and the outer joint member. Thus, a spherical contact between the outer spherical surface of the cage and the inner surface of the outer joint member, and a spherical contact between the inner spherical surface of the cage and the outer surface of the inner joint member are suppressed. Thus, smooth operation can be performed under high load and in high speed rotation. As a result, heat generation is suppressed, and durability is enhanced.

Further, the circumferential length of each of the pockets for housing the balls fitted to the tracks parallel to the axial line can be reduced, and hence a relatively large width of a cage pillar part (cage circumferential length), which influences a strength of the cage, can be secured. As a result, the strength of the cage can be enhanced.

When the center of curvature of each of the track grooves of the outer joint member and the center of curvature of each of the track grooves of the inner joint member are displaced with respect to the joint center in the radial direction, load capacities of the track grooves of the outer joint member and the inner joint member can be increased, and a thickness of a bottom portion of each of the track grooves can be increased.

Through employment of the undercut free type, high operating angles can be formed, and much higher operating angles can be formed when the straight portion of each of the track grooves is formed into the tapered portion.

When the track grooves are formed through forging, post processes can be omitted, and hence reduction of cost therefor can be achieved. Specific examples of the machining process comprise a grinding process and quenched-steel trimming, which enable the track grooves to be finished with high accuracy. Coolant is required for the grinding process. Meanwhile, the quenched-steel trimming is a so-called dry process that can be performed without the coolant, and hence burden on the environment can be reduced.

BRIEF DESCRIPTION OF DRAWINGS

FIG. 17B A development view of track grooves in a fixed type constant velocity universal joint comprising twelve balls.

DESCRIPTION OF EMBODIMENTS

In the following, description is made of embodiments of the present invention with reference to FIGS. 1 to 17.

Figure 1:
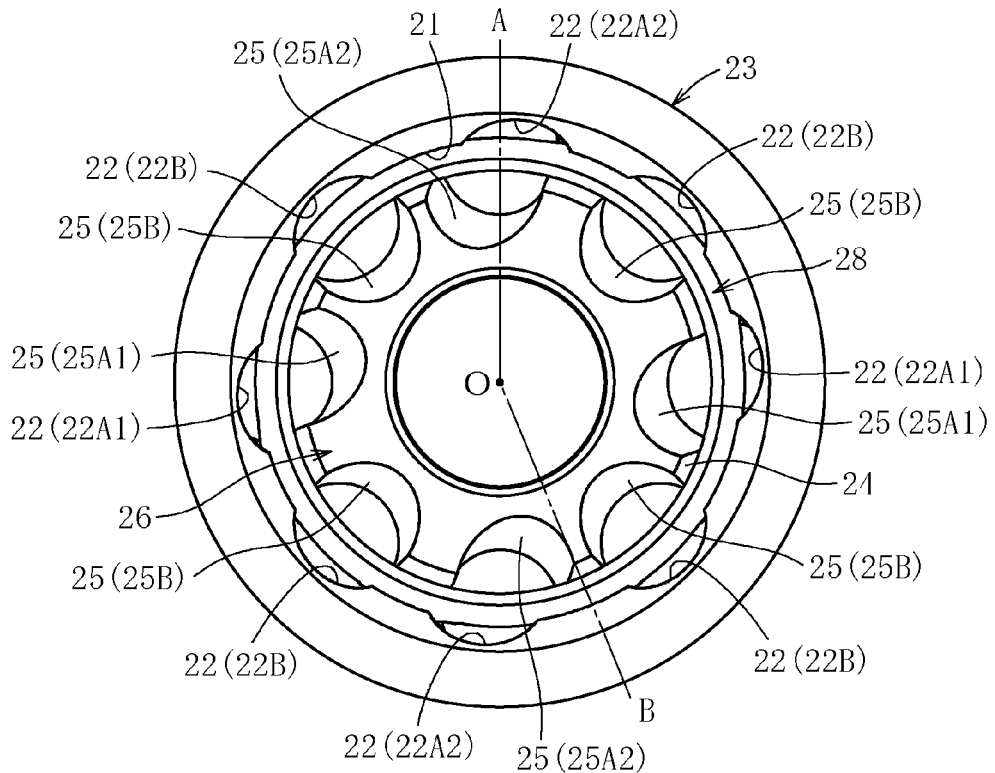
FIG. 1 A front view of a fixed type constant velocity universal joint according to a first embodiment of the present invention.

A fixed type constant velocity universal joint according to a first embodiment of the present invention comprises, as illustrated in FIGS. 1 and 2, an outer joint member 23 having an inner surface 21 including a plurality of (eight) track grooves 22 formed along an axial direction, an inner joint member 26 having an outer surface 24 including a plurality of (eight) track grooves 25 formed along the axial direction, a plurality of (eight) torque transmitting balls 27 arranged in ball tracks formed of pairs of the track grooves 22 of the outer joint member 23 and the track grooves 25 of the inner joint member 26, respectively, and a cage 28 which is interposed between the inner surface 21 of the outer joint member 23 and the outer surface 24 of the inner joint member 26 and holds the torque transmitting balls 27. The cage 28 comprises pockets 29 arranged at a predetermined pitch (45° pitch) along a circumferential direction, and the pockets 29 respectively house the balls 27.

Figure 6:
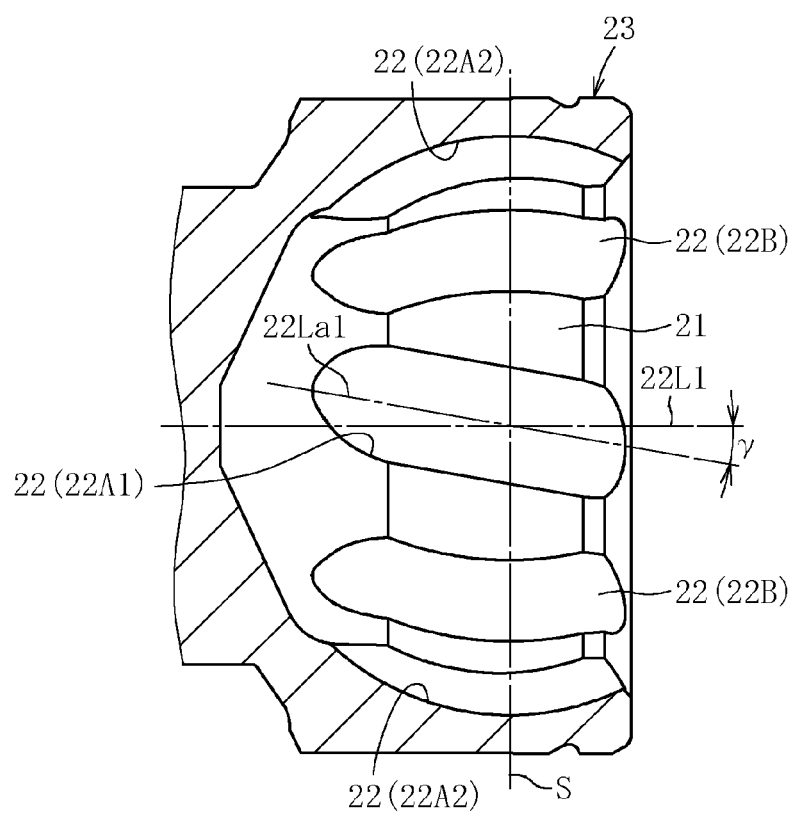
FIG. 6 A view as viewed in a direction of an arrow Y of FIG. 3.
Figure 7:
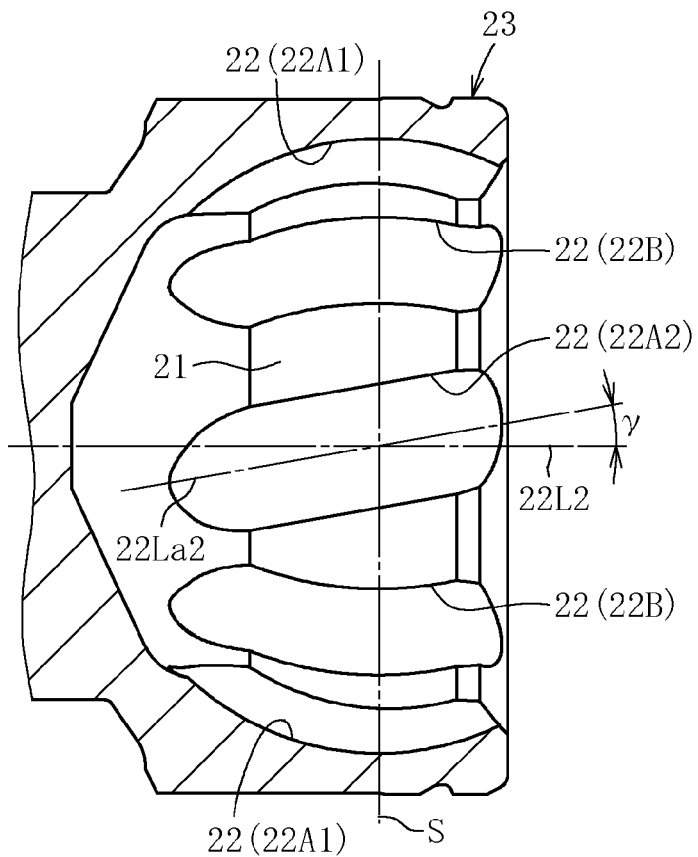
FIG. 7 A view as viewed in a direction of an arrow Z of FIG. 3.
Figure 8:
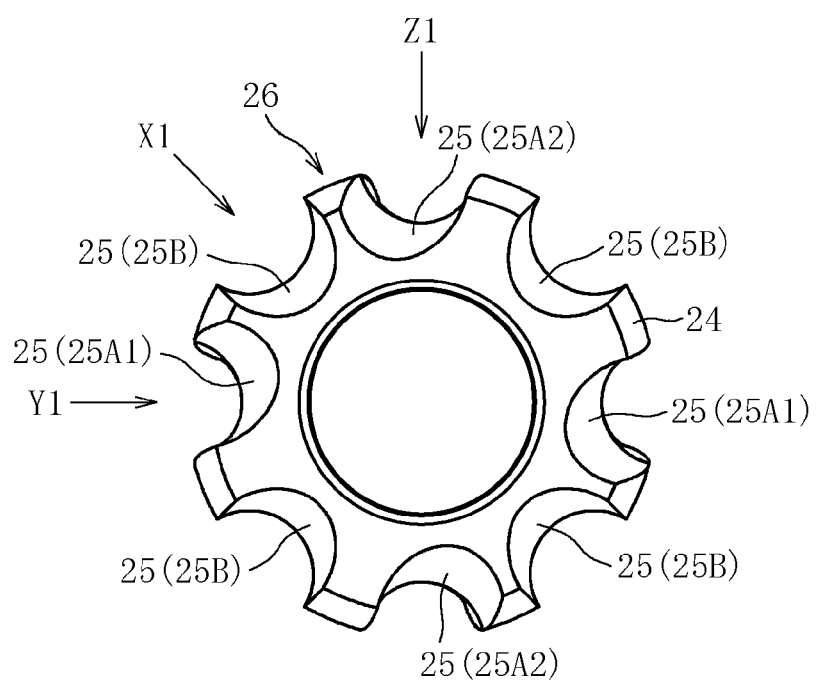
FIG. 8 A front view of an inner joint member of the fixed type constant velocity universal joint.
Figure 9:
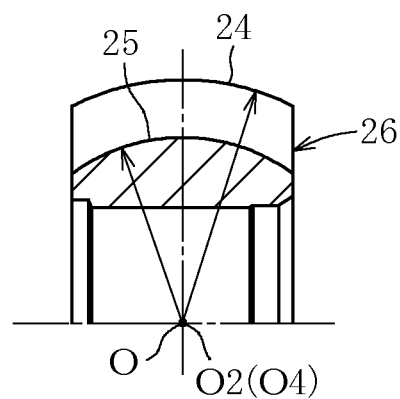
FIG. 9 A sectional view of the inner joint member of the fixed type constant velocity universal joint.

The track grooves 22 of the outer joint member 23 comprise inclined tracks 22A1 and 22A2 arranged at a 90° pitch along the circumferential direction and inclined in opposite directions with respect to an axial line. As illustrated in FIG. 6, an axial line 22La1 of the one inclined track 22A1 is inclined in a clockwise direction by γ with respect to a straight line 22L1 parallel to the joint axial line. As illustrated in FIG. 7, an axial line 22La2 of the another inclined track 22A2 is inclined in a counterclockwise direction by γ with respect to a straight line 22L2 parallel to the joint axial line.

Figure 5:
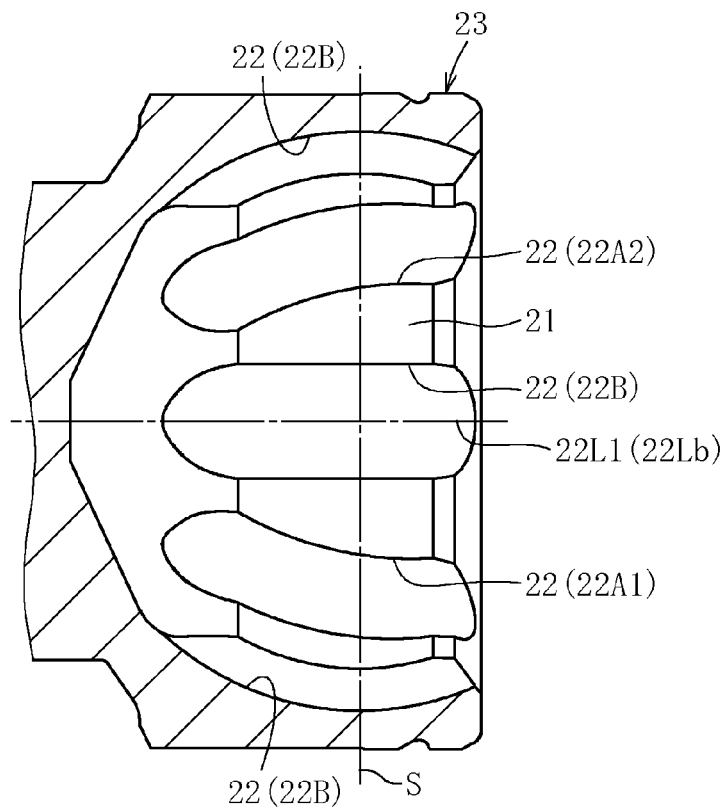
FIG. 5 A view as viewed in a direction of an arrow X of FIG. 3.

Further, as illustrated in FIG. 5, a track 22B parallel to the axial line is arranged between the inclined tracks 22A1 and 22A2. Therefore, the track 22B parallel to the axial line comprises four tracks 22B arranged at a 90° pitch along the circumferential direction. Note that, a center of curvature O1 of each of the track grooves 22 of the outer joint member 23 and a center of curvature O3 of the inner surface 21 of the outer joint member 23 are each matched with a joint center O.

Figure 11:
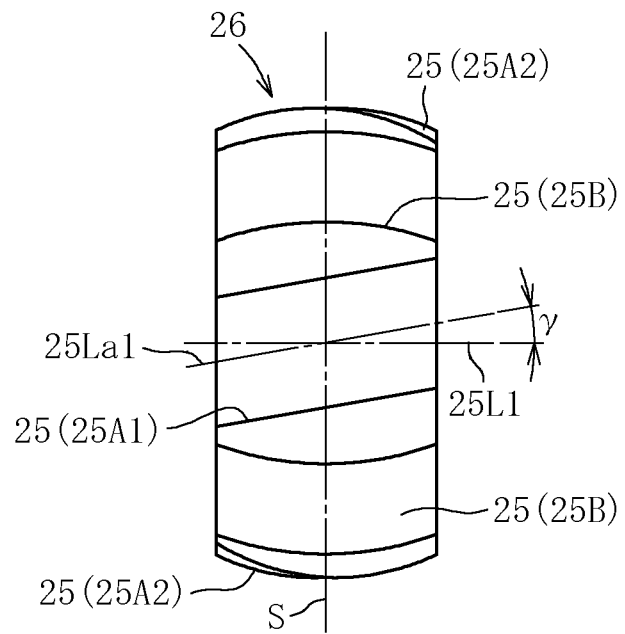
FIG. 11 A view as viewed in a direction of an arrow Y1 of FIG. 8.
Figure 12:
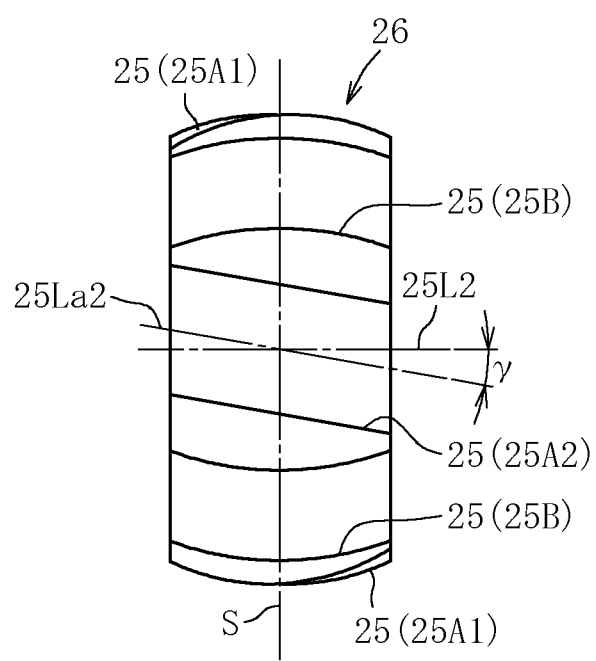
FIG. 12 A view as viewed in a direction of an arrow Z1 of FIG. 8.

The track grooves 25 of the inner joint member 26 comprise inclined tracks 25A1 and 25A2 arranged at a 90° pitch along the circumferential direction and inclined in opposite directions with respect to the axial line. As illustrated in FIG. 11, an axial line 25La1 of the one inclined track 25A1 is inclined in the counterclockwise direction by γ with respect to a straight line 25L1 parallel to the joint axial line. As illustrated in FIG. 12, an axial line 25La2 of the another inclined track 25A2 is inclined in the clockwise direction by γ with respect to a straight line 25L2 parallel to the joint axial line.

Figure 10:
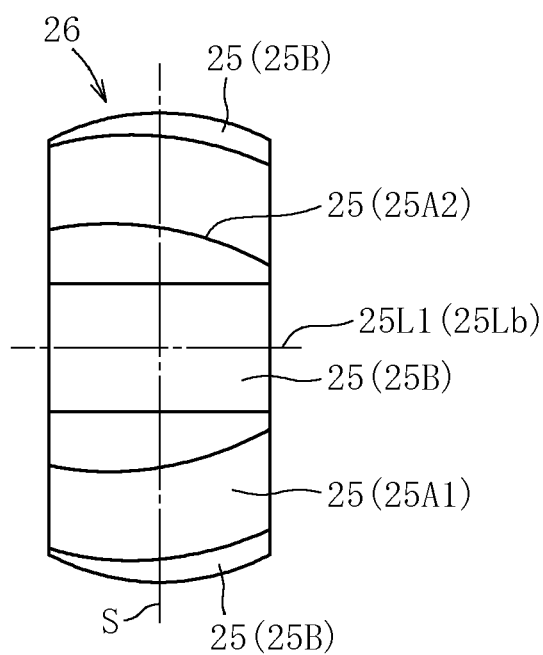
FIG. 10 A view as viewed in a direction of an arrow X1 of FIG. 8.

Further, as illustrated in FIG. 10, a track 25B parallel to the axial line is arranged between the inclined tracks 25A1 and 25A2. Therefore, the track 25B parallel to the axial line comprises four tracks 25B arranged at a 90° pitch along the circumferential direction. Note that, a center of curvature O2 of each of the track grooves 25 of the inner joint member 26 and a center of curvature O4 of the outer surface 24 of the inner joint member 26 are each matched with the joint center O. The balls 27 are arranged respectively between the inclined tracks 22A1 and 25A1 and between the inclined tracks 22A2 and 25A2 facing each other.

The track grooves 22 and 25 may be formed through forging, or the track grooves 22 and 25 may be formed through a machining process. When the track grooves 22 and 25 are formed through forging, post processes can be omitted, and hence reduction of cost therefor can be achieved. Specific examples of the machining process comprise a grinding process and quenched-steel trimming, which enable the track grooves 22 and 25 to be finished with high accuracy. Coolant is required for the grinding process. Meanwhile, the quenched-steel trimming is a so-called dry process that can be performed without the coolant, and hence burden on the environment can be reduced.

Figure 13:
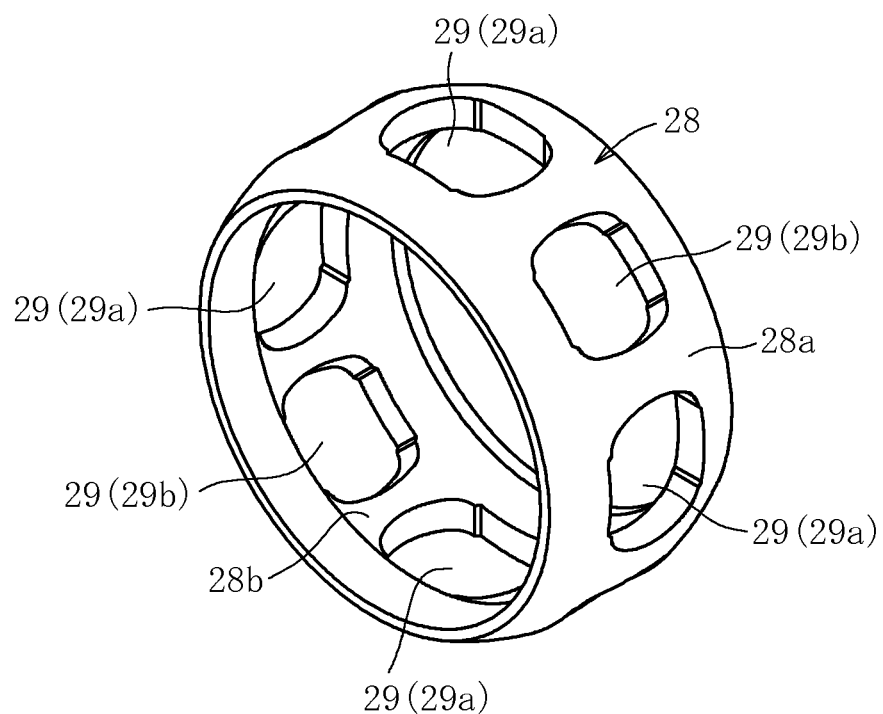
FIG. 13 A perspective view of a cage of the fixed type constant velocity universal joint.
Figure 14:
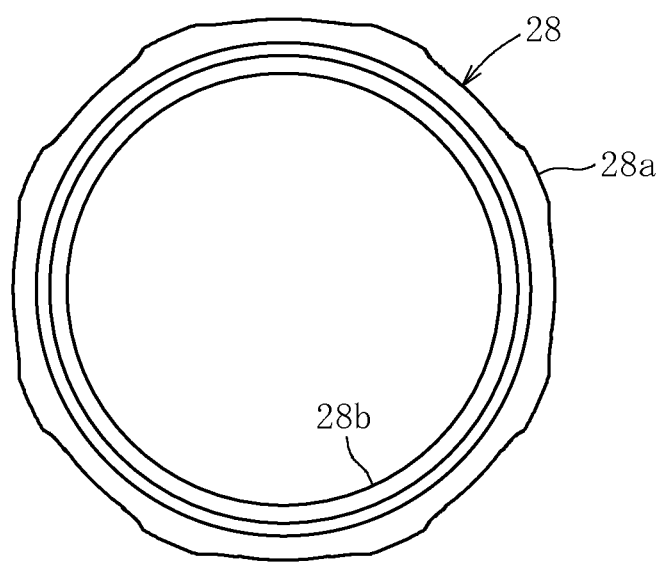
FIG. 14 A front view of the cage of the fixed type constant velocity universal joint.
Figure 15:
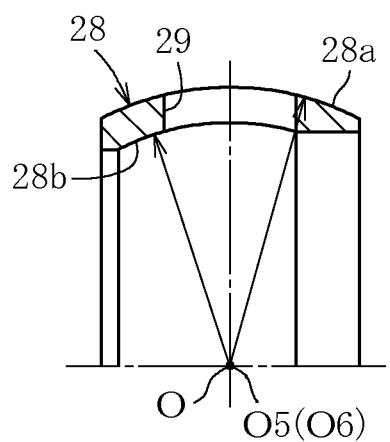
FIG. 15 A sectional view of the cage of the fixed type constant velocity universal joint.

FIGS. 13 to 15 illustrate the cage 28. As described above, the cage 28 comprises the eight pockets (window portions) 29 at the 45° pitch along the circumferential direction. The pockets 29 comprise long pockets 29a each having a large circumferential length and short pockets 29b each having a small circumferential length. The long pockets 29a and the short pockets 29b are arranged alternately to each other along the circumferential direction. In this case, the balls 27 housed in the long pockets 29a are fitted to inclined ball tracks formed of the inclined tracks 22A1, 22A2, 25A1, and 25A2. Further, the balls 27 housed in the short pockets 29b are fitted to the ball tracks parallel to the axial line, which are formed of the tracks 22B and 25B parallel to the axial line. Still further, the cage 28 has an outer spherical surface 28a having a center of curvature O5 and an inner spherical surface 28b having a center of curvature O6, which match with each other and with the joint center O.

Figure 16:
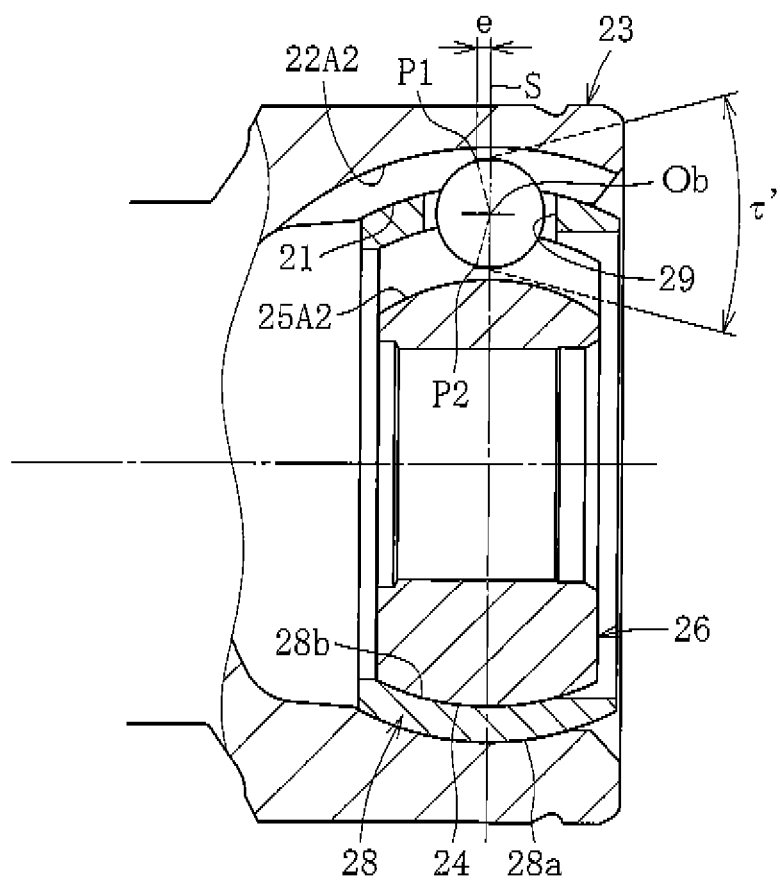
FIG. 16 A sectional view of the fixed type constant velocity universal joint which is under torque.

In this way, in the fixed type constant velocity universal joint described above, the center of curvature O1 of each of the track grooves 22 of the outer joint member 23 and the center of curvature O2 of each of the track grooves 25 of the inner joint member 26 have an axial offset of zero. Meanwhile, as illustrated in FIGS. 16 and 17C, a contact point P1 between the ball 27 and each of the inclined tracks 22A1 and 22A2 of the outer joint member 23, and a contact point P2 between the ball 27 and each of the inclined tracks 25A1 and 25A2 of the inner joint member 26 are displaced by a predetermined amount e with respect to a plane S passing through the joint center O and ball centers Ob of the balls 27 under a state in which an operating angle is not formed. In other words, the contact points P1 and P2 of the inclined tracks 22A1 and 25A1 are displaced to a joint opening side by the predetermined amount e with respect to the plane S. Further, the contact points P1 and P2 of the inclined tracks 22A2 and 25A2 are displaced to a depth side by the predetermined amount e with respect to the plane S.

Thus, by an influence of the intersection angle γ, ones of the balls 27, which are adjacent to each other in the circumferential direction, form wedge angles τ and τ' in opposite directions. In other words, forces are alternately applied to adjacent ones of the pockets 29, and the wedge angles τ and τ' are alternately formed in opposite directions. Thus, a force W1 is applied in each of the inclined tracks 22A1 and 25A1, and a force W2 is applied in a direction opposite to that of the force W1 in each of the inclined tracks 22A2 and 25A2. Therefore, the cage position is stabilized in bisecting planes of the inner joint member 26 and the outer joint member 23.

Further, the contact points P1 and P2 between the balls 27 and the tracks 22B and 25B parallel to the axial line are located in the plane S, and hence wedge angles are not formed. Therefore, the force W1 (W2) and the like are not generated from the balls 27 to the cage 28.

In the fixed type constant velocity universal joint of the present invention, at low angles, forces are alternately applied to the adjacent ones of the window portions (pockets) 29 of the cage 28, which correspond to the inclined tracks 22A1, 22A2, 25A1, and 25A2 intersecting each other, so that the cage position is stabilized in the bisecting planes of the inner joint member 26 and the outer joint member 23. Thus, a spherical contact between the outer spherical surface 28a of the cage and the inner surface 21 of the outer joint member 23 and a spherical contact between the inner spherical surface 28b of the cage and the outer surface 24 of the inner joint member 26 are suppressed. Thus, smooth operation can be performed under high load and in high speed rotation. As a result, heat generation is suppressed, and durability is enhanced.

Orbits of the balls 27 in the tracks 22B and 25B parallel to the axial line are not significantly shifted in the circumferential direction. Thus, a circumferential length of each of the pockets 29 for housing the balls 27 fitted to the tracks 22B and 25B parallel to the axial line can be reduced. In other words, of the pockets 29 arranged along the circumferential direction, the circumferential length of each of the pockets 29 for housing the balls 27 fitted to the tracks 22B and 25B parallel to the axial line can be reduced, and hence a relatively large width of a cage pillar part (cage circumferential length), which influences a strength of the cage 28, can be secured. As a result, the strength of the cage 28 can be enhanced.

Figure 2A:
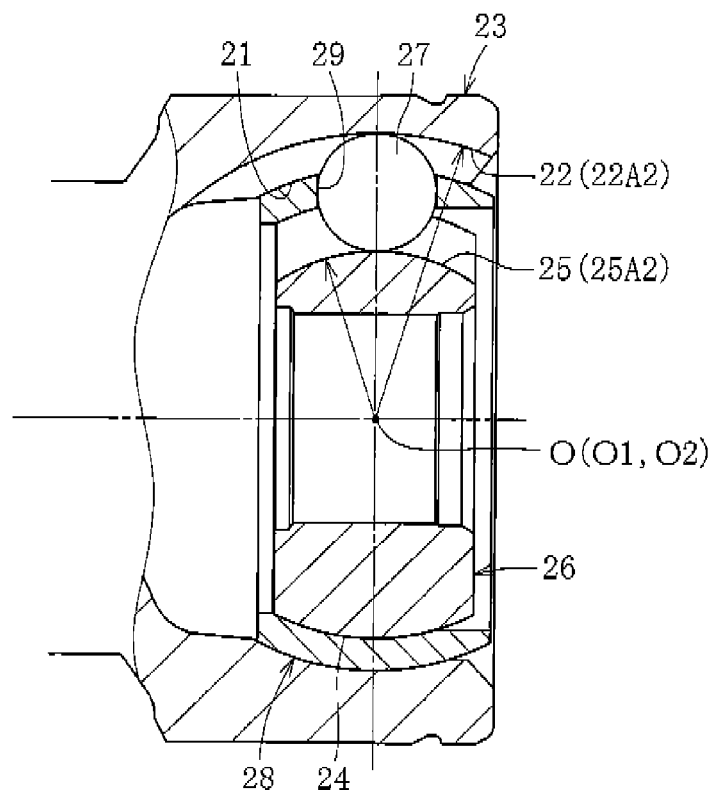
FIG. 2A A sectional view taken along the line A-O-B of FIG. 1.
Figure 2B:
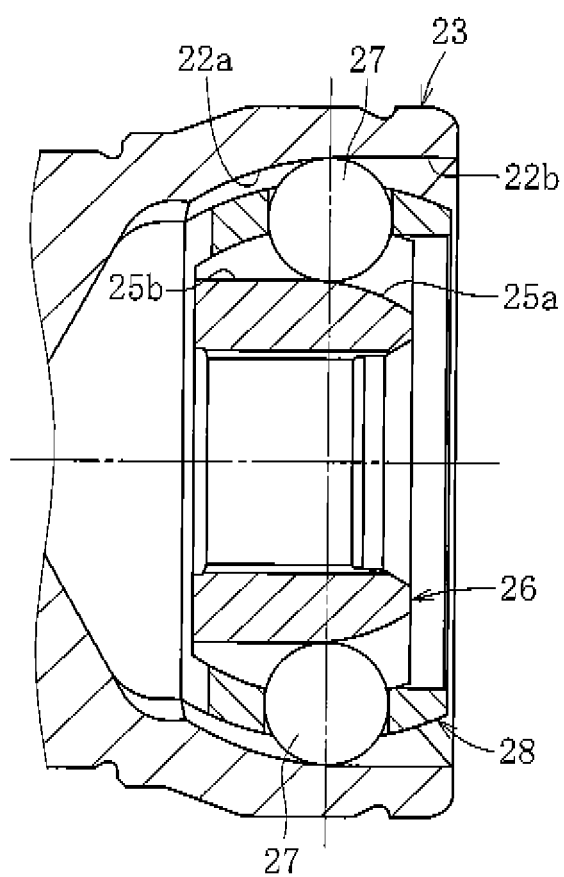
FIG. 2B A sectional view of an undercut free type fixed type constant velocity universal joint.
Figure 2C:
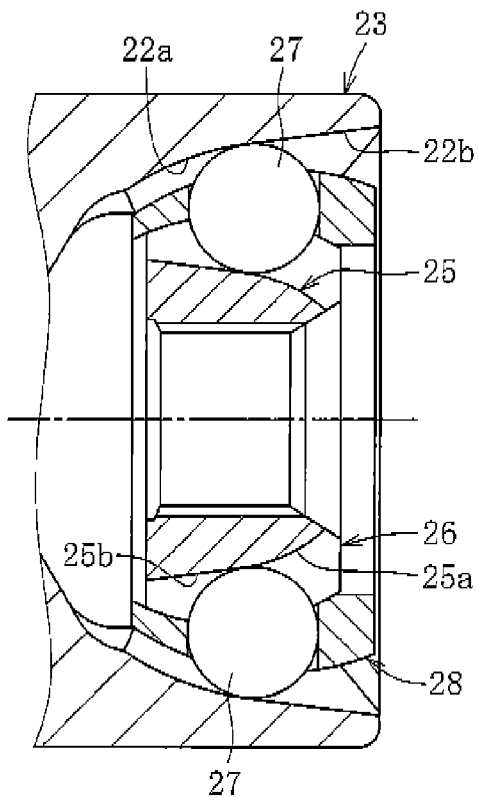
FIG. 2C A sectional view of a fixed type constant velocity universal joint, wherein a straight portion of each of track grooves comprises a tapered portion.

As illustrated in FIG. 2A, a fixed type constant velocity universal joint of a Birfield type (BJ) is described above in this embodiment. However, as illustrated in FIG. 2B, the present invention may be applied to an undercut free type in which a bottom surface of each of the track grooves of the outer joint member 23 and a bottom surface of each of the track grooves of the inner joint member 26 each comprise a curved portion and a straight portion. Further, as illustrated in FIG. 2C, the straight portion of each of the track grooves 22 of the outer joint member 23 may comprise a tapered portion inclined toward an outer diameter side from the depth side to the opening side, and the straight portion of each of the track grooves 25 of the inner joint member 26 may comprise a tapered portion inclined toward the outer diameter side from the opening side to the depth side.

Through employment of the undercut free type, high operating angles can be formed, and much higher operating angles can be formed when the straight portion of each of the track grooves 22 and 25 is formed into the tapered portion.

Figure 2D:
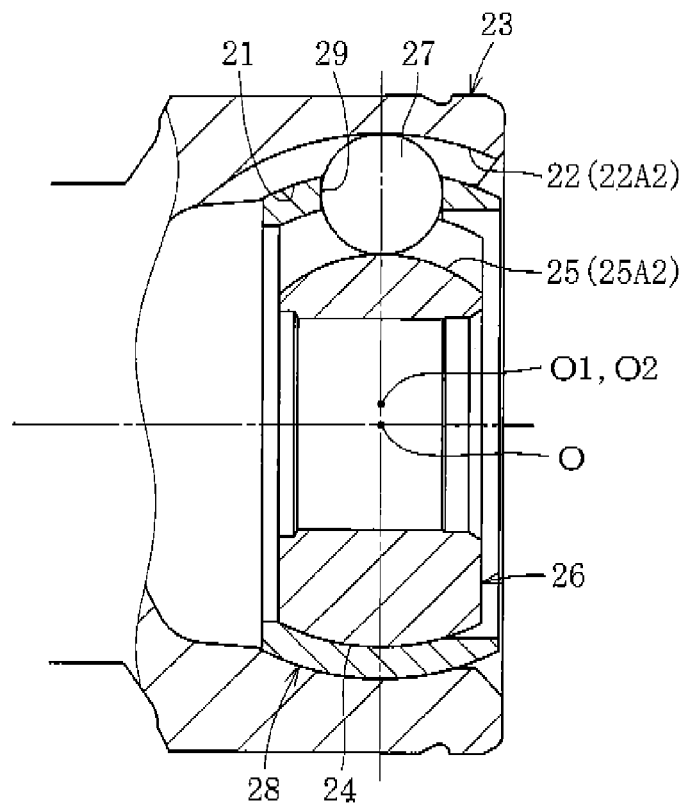
FIG. 2D A sectional view of a fixed type constant velocity universal joint, wherein a center of curvature of each track groove is radially displaced toward the track groove.
Figure 2E:
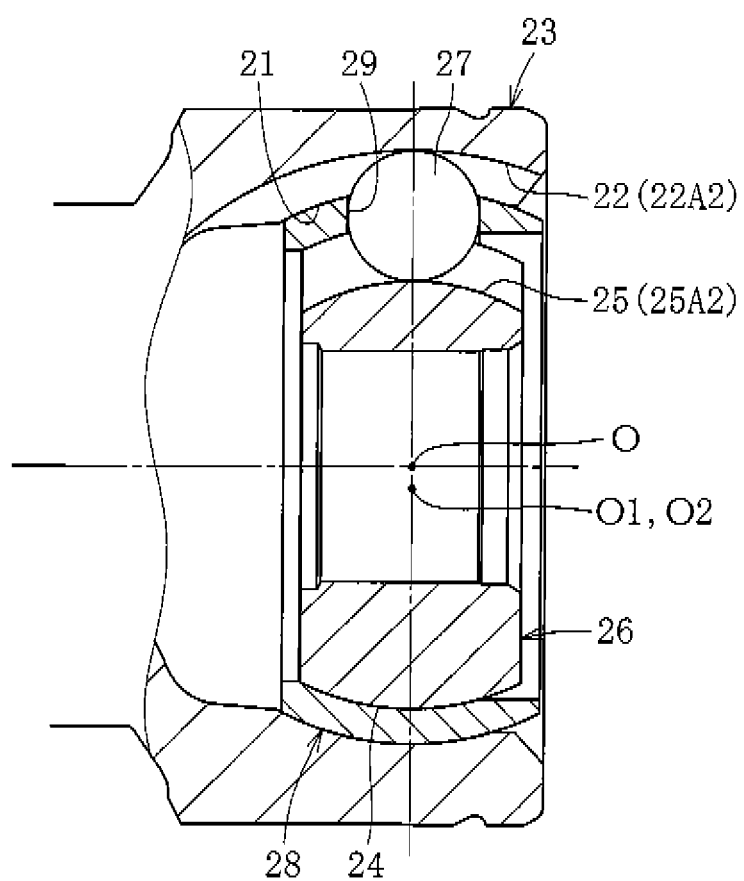
FIG. 2E A sectional view of a fixed type constant velocity universal joint, wherein a center of curvature of each track groove is radially displaced toward a side opposite to the track groove.
Figure 3:
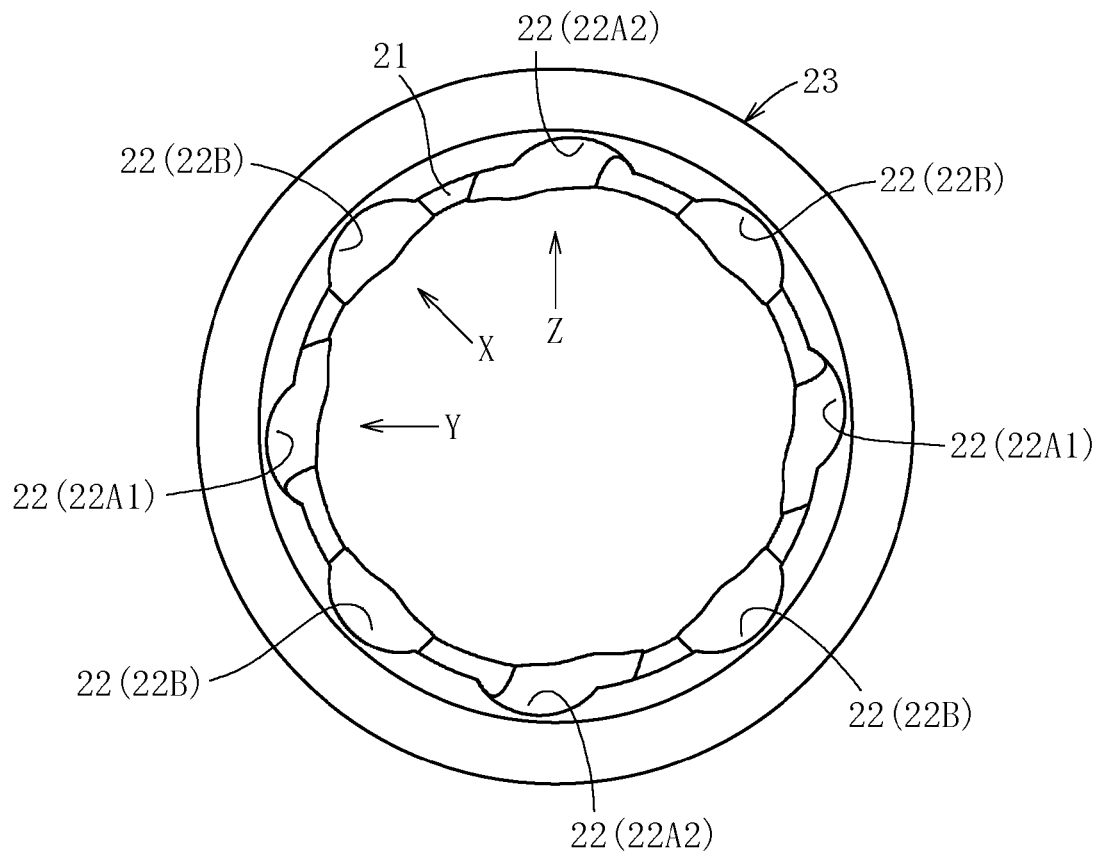
FIG. 3 A front view of an outer joint member of the fixed type constant velocity universal joint.
Figure 4:
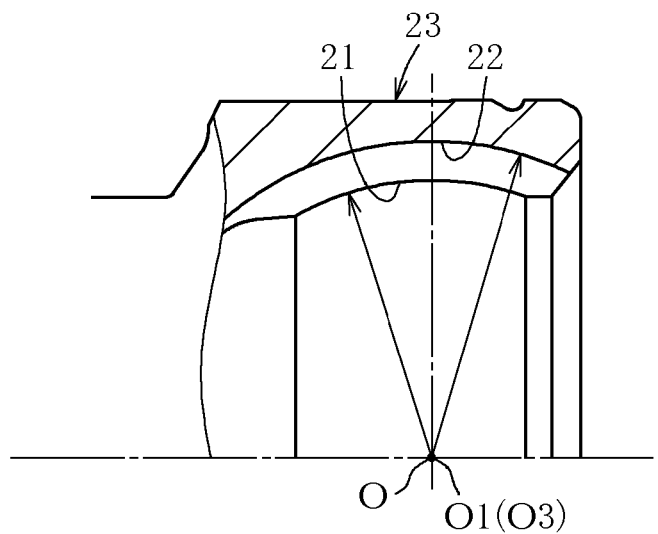
FIG. 4 A sectional view of the outer joint member of the fixed type constant velocity universal joint.

As illustrated in FIGS. 2D and 2E, the center of curvature O1 of each of the track grooves 22 of the outer joint member 23 and the center of curvature O2 of each of the track grooves 25 of the inner joint member 26 may be displaced with respect to the joint center O in a radial direction (radial offset). Referring to FIG. 2D, the centers of curvature O1 and O2 are displaced toward the track grooves 22 and 25 with respect to the joint center O. Referring to FIG. 2E, the centers of curvature O1 and O2 are displaced away from the track grooves 22 and 25 with respect to the joint center. With such setting, load capacities of the track grooves 22 and 25 of the outer joint member 23 and the inner joint member 26 can be increased, and a thickness of the bottom portion of each of the track grooves can be increased.

Figure 17A:
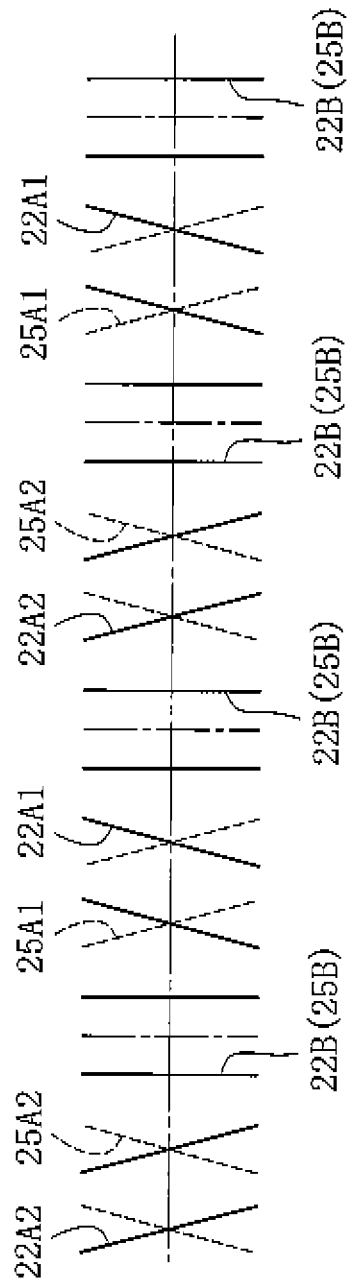
FIG. 17A A development view of track grooves in a fixed type constant velocity universal joint comprising eight balls.
Figure 17C:
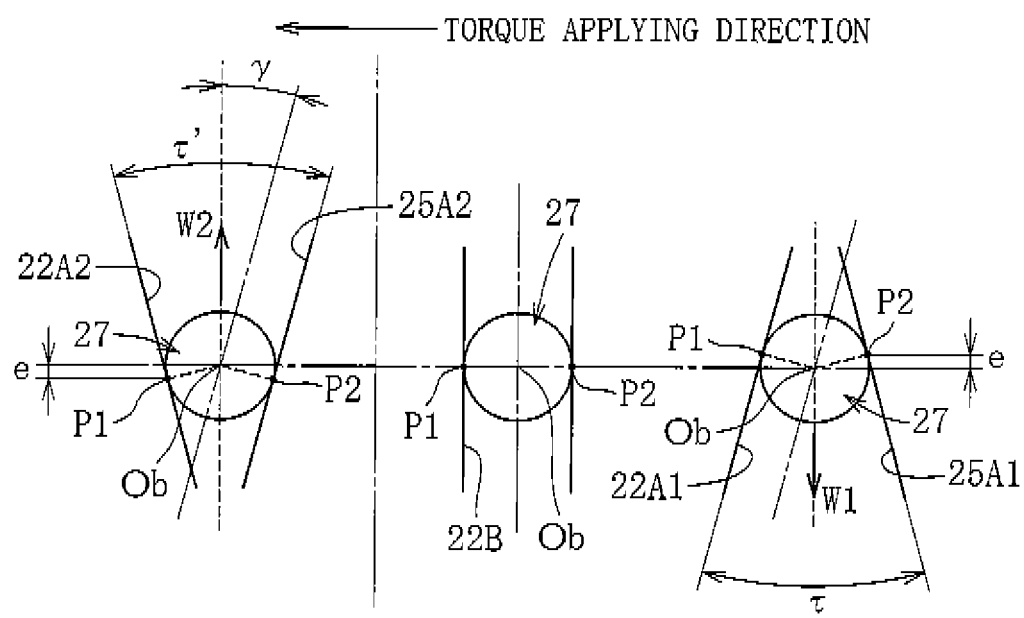
FIG. 17C A simplified development view of a fixed type constant velocity joint which is under torque.
Figure 18:
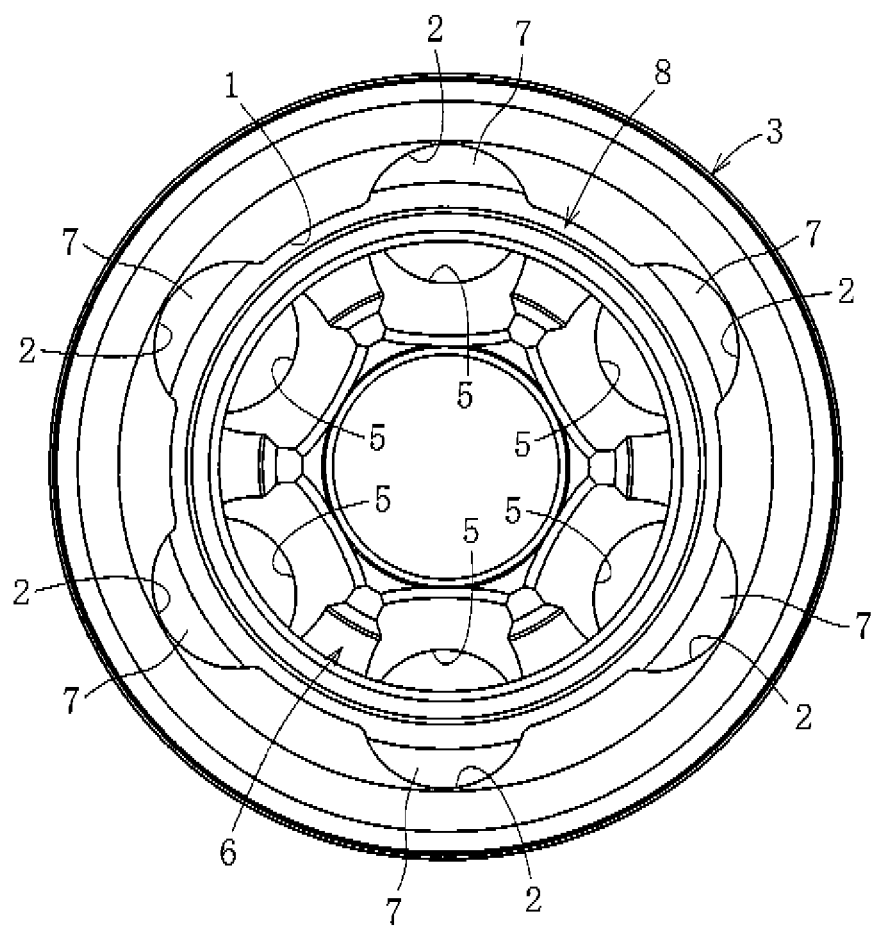
FIG. 18 A front view of a conventional fixed type constant velocity universal joint including six balls as torque transmitting members.
Figure 19:
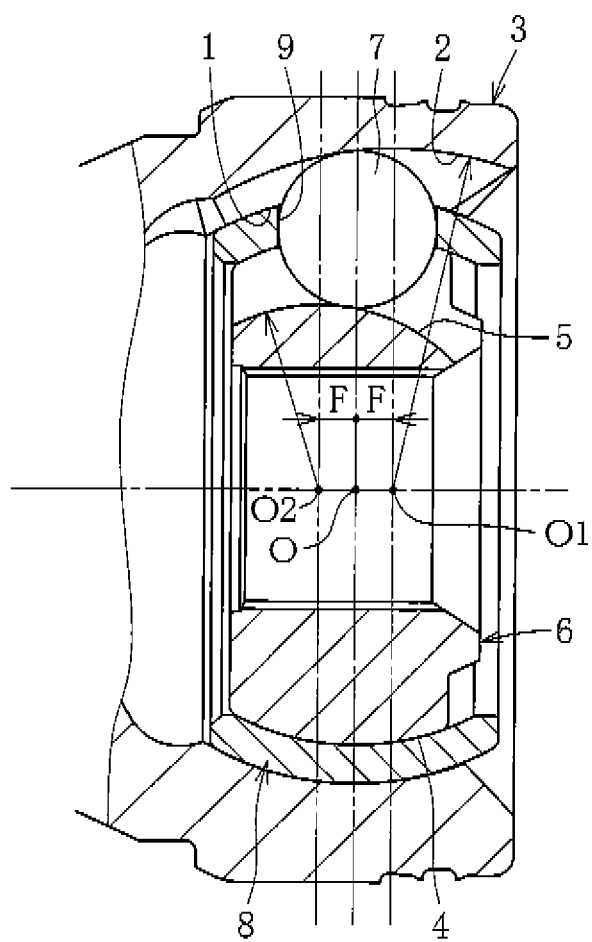
FIG. 19 A sectional view of the fixed type constant velocity universal joint illustrated in FIG. 18.
Figure 20:
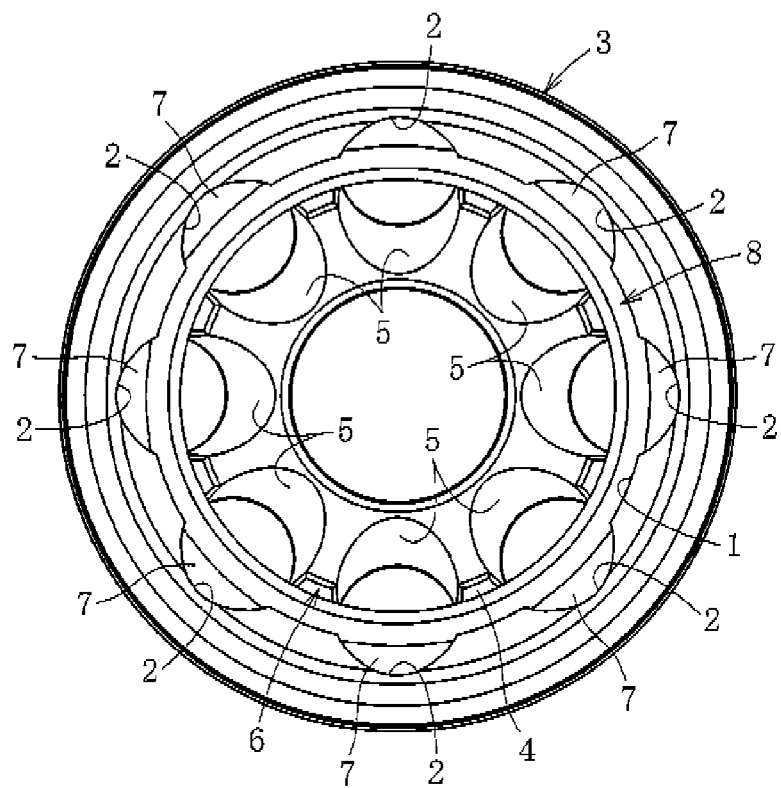
FIG. 20 A front view of a conventional fixed type constant velocity universal joint including eight balls as torque transmitting members.
Figure 21:
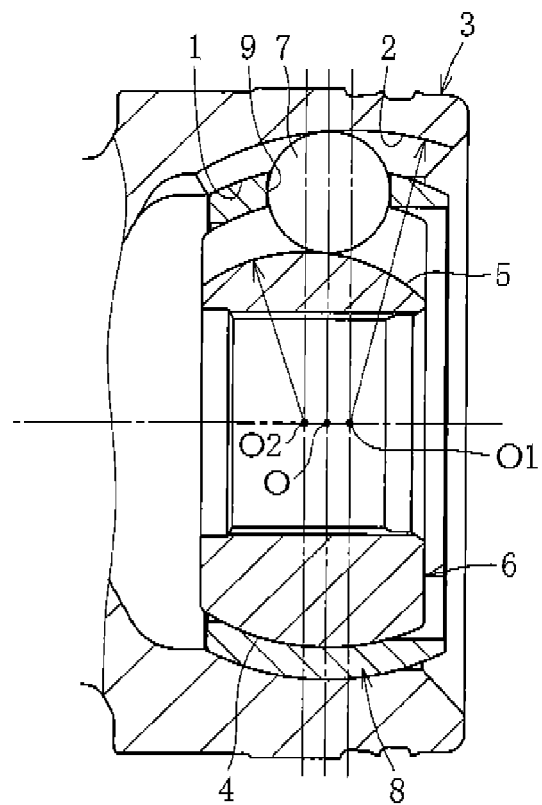
FIG. 21 A sectional view of the fixed type constant velocity universal joint illustrated in FIG. 20.
Figure 22:
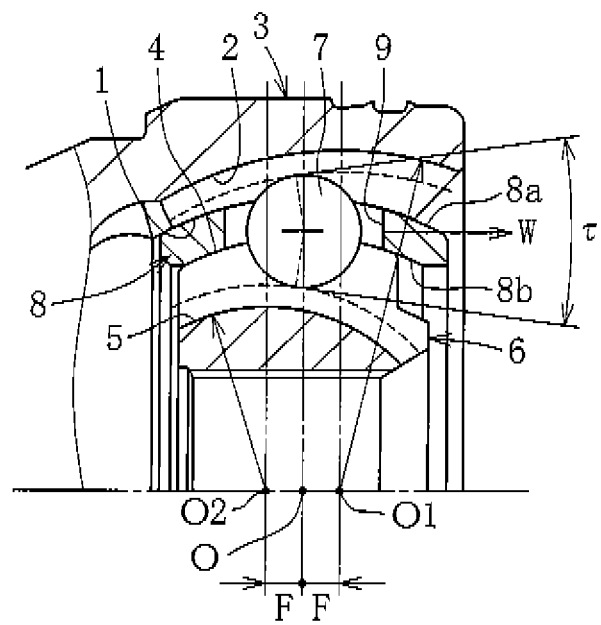
FIG. 22 A view illustrating a problem in a case where a wedge angle is formed.
Figure 23:
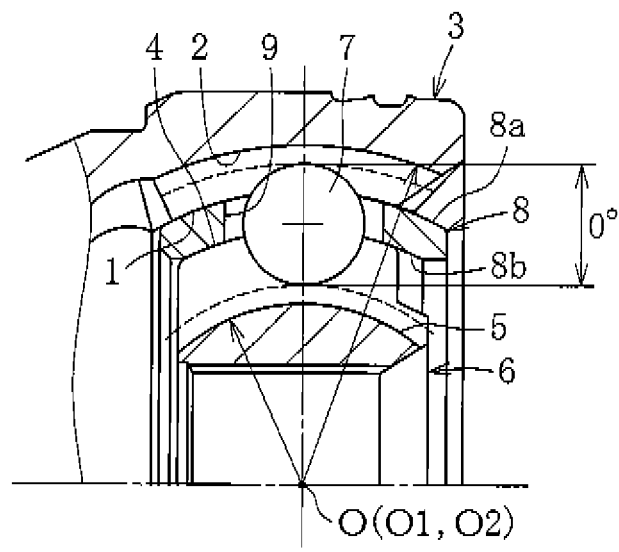
FIG. 23 A sectional view of a wedge-angle-free constant velocity universal joint.

Further, as illustrated in FIG. 17A, the eight balls 27 are provided as torque transmitting members as described above in this embodiment, but as illustrated in FIG. 17B, the balls 27 may comprise twelve balls 27. When the twelve balls 27 are employed, the center of curvature of each of the track grooves 22 of the outer joint member 23 and the center of curvature of each of the track grooves 25 of the inner joint member 26 have an axial offset of zero. In addition, the track grooves 22 and 25 of the outer joint member 23 and the inner joint member 26 each comprise inclined tracks arranged at a 60° pitch along the circumferential direction and inclined in opposite directions with respect to the axial line, and another track groove between the inclined tracks is provided as an axial track.

Thus, the fixed type constant velocity universal joint comprising the twelve balls 27 also has the same functions and advantages as those of the fixed type constant velocity universal joint comprising the eight balls 27. Further, when the fixed type constant velocity universal joint comprises the eight balls or the twelve balls, load on each of the balls can be reduced, and higher efficiency can be achieved. Thus, a strength, a load torque, and durability can be enhanced, and a ball diameter can be reduced. As a result, the joint can be downsized as a whole.

With regard to the description of the embodiment of the present invention, the present invention is not limited to the embodiment described above, and various modifications may be made thereto. For example, when the radial offset is provided, an amount of the radial offset can be arbitrarily set as far as the load capacities of the track grooves 22 and 25 of the outer joint member 23 and the inner joint member 26 can be increased, or the thickness of the bottom portion of each of the track grooves 22 and 25 can be increased. Note that, in the undercut free type, when the linear portion (straight portion) of the track groove bottom comprises a tapered portion, an inclination angle of the tapered portion also can be arbitrarily set. However, when the inclination angle is excessively high, a thickness on the opening side of the outer joint member 23 is reduced, which is disadvantageous in strength. Thus, when the tapered portion is formed, the inclination angle needs to be set in consideration of formation of higher angles and the strength on the opening side of the outer joint member 23.

INDUSTRIAL APPLICABILITY

The fixed type constant velocity universal joint according to the present invention is applicable not only to a half shaft, a propeller shaft, and the like, but also to power transmission systems of various other industrial machines.

REFERENCE SIGNS LIST 21 inner surface
22 track groove
22A1, 22A2 inclined track
22B track parallel to axial line
23 outer joint member
24 outer surface
25 track groove
25A1, 25A2 inclined track
25B track parallel to axial line
26 inner joint member
27 torque transmitting ball
28 cage
29 pocket

The invention claimed is:

1. A fixed type constant velocity universal joint, comprising:
   an outer joint member having an inner surface including eight track grooves;
   an inner joint member having an outer surface including eight track grooves;
   eight torque transmitting balls arranged in ball tracks formed of pairs of the eight track grooves of the outer joint member and the eight track grooves of the inner joint member, respectively; and
   a cage which is interposed between the inner surface of the outer joint member and the outer surface of the inner joint member and holds the eight torque transmitting balls,
   wherein bottom surfaces of all of the eight track grooves of the outer joint member and bottom surfaces of all of the eight track grooves of the inner joint member each have a circular-arc portion,
   wherein an outer spherical surface of the cage and the inner surface of the outer joint member are brought into contact with each other,
   wherein an inner spherical surface of the cage and the outer surface of the inner joint member are brought into contact with each other,
   wherein a center of curvature of each of the eight track grooves of the outer joint member and a center of curvature of each of the eight track grooves of the inner joint member have an amount of displacement of zero, the amount of displacement being defined in a joint axis direction relative to a joint center, and
   wherein the eight track grooves of each of the outer joint member and the inner joint member comprise:
      inclined tracks arranged at a 90° pitch along a circumferential direction and inclined in opposite directions with respect to a straight line parallel to a joint axial line; and
      other tracks which are formed between the inclined tracks and axially extend along a straight line parallel to the joint axial line.

2. A fixed type constant velocity universal joint according to claim 1,
   wherein the cage comprises pockets for housing the eight torque transmitting balls, and
   wherein the pockets comprise pockets which are adjacent to each other in the circumferential direction and each have a different circumferential length.

3. A fixed type constant velocity universal joint according to claim 2, wherein the center of curvature of each of the eight track grooves of the outer joint member and the center of curvature of each of the eight track grooves of the inner joint member are displaced with respect to the joint center in a radial direction.

4. A fixed type constant velocity universal joint according to claim 2, comprising an undercut free type fixed type constant velocity universal joint in which the bottom surface of each of the eight track grooves of the outer joint member and the bottom surface of each of the eight track grooves of the inner joint member each comprise a curved portion and a straight portion.

5. A fixed type constant velocity universal joint according to claim 4,
   wherein the straight portion of the each of the eight track grooves of the outer joint member comprises a tapered portion inclined toward an outer diameter side from a depth side to an opening side, and
   wherein the straight portion of the each of the eight track grooves of the inner joint member comprises a tapered portion inclined toward the outer diameter side from the opening side to the depth side.

6. A fixed type constant velocity universal joint according to claim 2, wherein the eight track grooves of each of the outer joint member and the inner joint member are each formed through forging.

7. A fixed type constant velocity universal joint according to claim 1, wherein the center of curvature of each of the eight track grooves of the outer joint member and the center of curvature of each of the eight track grooves of the inner joint member are displaced with respect to the joint center in a radial direction.

8. A fixed type constant velocity universal joint according to claim 7, comprising an undercut free type fixed type constant velocity universal joint in which the bottom surface of each of the eight track grooves of the outer joint member and the bottom surface of each of the eight track grooves of the inner joint member each comprise a curved portion and a straight portion.

9. A fixed type constant velocity universal joint according to claim 8,
wherein the straight portion of the each of the eight track grooves of the outer joint member comprises a tapered portion inclined toward an outer diameter side from a depth side to an opening side, and
wherein the straight portion of the each of the eight track grooves of the inner joint member comprises a tapered portion inclined toward the outer diameter side from the opening side to the depth side.

10. A fixed type constant velocity universal joint according to claim 1, comprising an undercut free type fixed type constant velocity universal joint in which the bottom surface of each of the eight track grooves of the outer joint member and the bottom surface of each of the eight track grooves of the inner joint member each comprise a curved portion and a straight portion.

11. A fixed type constant velocity universal joint according to claim 10,
wherein the straight portion of the each of the eight track grooves of the outer joint member comprises a tapered portion inclined toward an outer diameter side from a depth side to an opening side, and
wherein the straight portion of the each of the eight track grooves of the inner joint member comprises a tapered portion inclined toward the outer diameter side from the opening side to the depth side.

12. A fixed type constant velocity universal joint according to claim 1, wherein the eight track grooves of each of the outer joint member and the inner joint member are each formed through forging.

13. A fixed type constant velocity universal joint according to claim 1, wherein the eight track grooves of each of the outer joint member and the inner joint member are each formed through a machining process.

14. A fixed type constant velocity universal joint, comprising:
an outer joint member having an inner surface including twelve track grooves;
an inner joint member having an outer surface including twelve track grooves;
twelve torque transmitting balls arranged in ball tracks formed of pairs of the twelve track grooves of the outer joint member and the twelve track grooves of the inner joint member, respectively; and
a cage which is interposed between the inner surface of the outer joint member and the outer surface of the inner joint member and holds the twelve torque transmitting balls,
wherein bottom surfaces of all of the twelve track grooves of the outer joint member and bottom surfaces of all of the twelve track grooves of the inner joint member have a circular-arc portion,
wherein an outer spherical surface of the cage and the inner surface of the outer joint member are brought into contact with each other,
wherein an inner spherical surface of the cage and the outer surface of the inner joint member are brought into contact with each other,
wherein a center of curvature of each of the twelve track grooves of the outer joint member and a center of curvature of each of the twelve track grooves of the inner joint member have an amount of displacement of zero, the amount of displacement being defined in a joint axis direction relative to a joint center, and
wherein the twelve track grooves of each of the outer joint member and the inner joint member comprise:
inclined tracks arranged at a 60° pitch along a circumferential direction and inclined in opposite directions with respect to a straight line parallel to a joint axial line; and
other tracks which are formed between the inclined tracks and axially extend along a straight line parallel to the joint axial line.

15. A fixed type constant velocity universal joint according to claim 14,
wherein the cage comprises pockets for housing the twelve torque transmitting balls, and
wherein the pockets comprise pockets which are adjacent to each other in the circumferential direction and each have a different circumferential length.

16. A fixed type constant velocity universal joint according to claim 14, wherein the center of curvature of each of the twelve track grooves of the outer joint member and the center of curvature of each of the twelve track grooves of the inner joint member are displaced with respect to the joint center in a radial direction.

17. A fixed type constant velocity universal joint according to claim 14, comprising an undercut free type fixed type constant velocity universal joint in which the bottom surface of each of the twelve track grooves of the outer joint member and the bottom surface of each of the twelve track grooves of the inner joint member each comprise a curved portion and a straight portion.

18. A fixed type constant velocity universal joint according to claim 17,
wherein the straight portion of the each of the twelve track grooves of the outer joint member comprises a tapered portion inclined toward an outer diameter side from a depth side to an opening side, and
wherein the straight portion of the each of the twelve track grooves of the inner joint member comprises a tapered portion inclined toward the outer diameter side from the opening side to the depth side.

19. A fixed type constant velocity universal joint according to claim 14, wherein the twelve track grooves of each of the outer joint member and the inner joint member are each formed through forging.

20. A fixed type constant velocity universal joint according to claim 14, wherein the twelve track grooves of each of the outer joint member and the inner joint member are each formed through a machining process.

* * * * *